United States Patent [19]

Sylven et al.

[11] Patent Number: 4,527,313
[45] Date of Patent: Jul. 9, 1985

[54] ARRANGEMENT IN A LOOP FITTING OR LOCKING TONGUE FOR RETRACTOR-TYPE SAFETY BELTS

[75] Inventors: Hans Sylven, Vargarda; Leif Ennerdal, Alingsas; Lars-Eije Berg, Vargarda, all of Sweden

[73] Assignee: AB Stil-Industri, Vargarda, Sweden

[21] Appl. No.: 497,859

[22] Filed: May 25, 1983

[30] Foreign Application Priority Data

May 25, 1982 [SE] Sweden ............................. 8203219

[51] Int. Cl.³ .................. B60R 21/10; A44C 5/18
[52] U.S. Cl. ....................................... 24/464; 24/141; 24/265 BC; 297/483
[58] Field of Search .......... 24/464, 640, 642, 265 EC, 24/265 BC, 265 C, 610, 612, 323, 616, 141; 49/462; 297/483, 482, 468

[56] References Cited

U.S. PATENT DOCUMENTS

| | | | |
|---|---|---|---|
| 1,410,900 | 3/1922 | Durr | 24/141 |
| 2,822,033 | 2/1958 | Dixon | 297/468 |
| 3,547,516 | 12/1970 | Shanok et al. | 49/462 |
| 3,580,647 | 5/1971 | Richards | 24/141 |
| 3,752,209 | 8/1973 | Swanson | 24/265 C |
| 3,912,329 | 10/1975 | Connors et al. | 24/265 BC |
| 3,959,855 | 6/1976 | Fisher | 297/483 |
| 4,023,826 | 5/1977 | Kokubo et al. | 297/483 |
| 4,102,020 | 7/1978 | Lindblad | 297/483 |
| 4,142,274 | 3/1979 | Scholz et al. | 297/483 |

*Primary Examiner*—Victor N. Sakran
*Attorney, Agent, or Firm*—Cushman, Darby & Cushman

[57] ABSTRACT

The invention relates to an arrangement in a loop fitting or locking tongue for retractor-type safety belts, forming a slot (13) for the passage of the belt strap and reorientation of the path of the strap over an edge of the slot. The loop fitting or locking tongue is coated with a layer (11) of plastic material, and an edge lining (14) of another plastic material than said plastic layer and having low-friction properties is mounted as a separate element on said edge. The edge lining is let into the surface of the plastic layer, and hook-shaped marginal portions (15) of the lining engage shoulders (16) formed by the plastic layer at the front and rear sides of the loop fitting or locking tongue.

2 Claims, 3 Drawing Figures

ARRANGEMENT IN A LOOP FITTING OR LOCKING TONGUE FOR RETRACTOR-TYPE SAFETY BELTS

The invention relates to an arrangement in a loop fitting or locking tongue for retractor-type safety belts, forming a slot for the passage of the belt strap and reorientation of the path of the strap over an edge of the slot and coated with a layer of plastic material, on which an edge lining of a low-friction material is mounted as a separate element, said edge lining forming a curved contact surface for the belt strap.

It is desired that the strap moves easily through a loop fitting in order to avoid a heavy spring load on the belt retractor for the retraction of the belt strap and a locking tongue hanging thereon when the safety belt is put out of use, and in order to facilitate withdrawal of the belt strap when the safety belt is put into use. Moreover, the belt strap should be able to move through the loop fitting without any restrain, as may be necessary when the belt is in use. The strap should run easily also through a locking tongue in order to facilitate the use of the safety belt.

In order to satisfy these requirements there is provided according to the invention an arrangement of the kind referred to above wherein the edge lining consists of another plastic material than said plastic layer and is let into the surface thereof, hook-shaped marginal portions of said edge lining engaging shoulders formed by the plastic layer at the front and rear sides of the loop fitting or locking tongue.

In order to illustrate the invention an embodiment thereof will be described in detail below, reference being made to the accompanying drawing in which.

Figure 1:
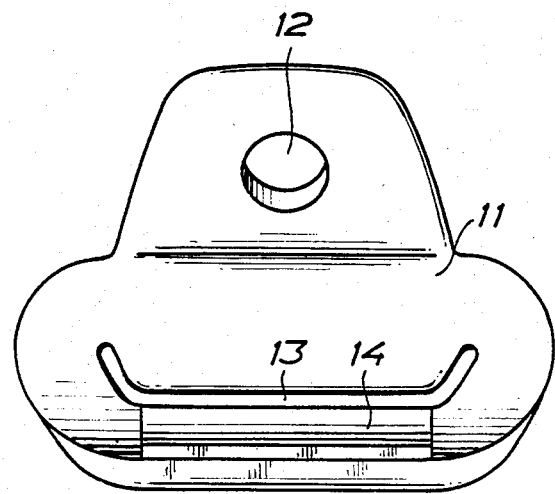
FIG. 1 is a front view of a loop fitting according to the invention.
Figure 2:
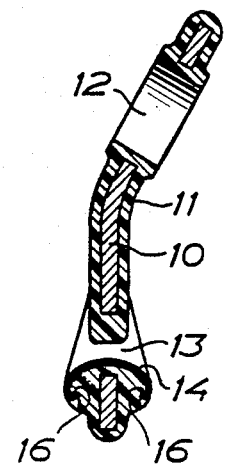
FIG. 2 is a cross-sectional view of the loop fitting in FIG. 1.

The loop fitting shown in the drawing comprises a pressed steel sheet element 10 which is "baked" into a suitable plastic material and accordingly has a plastic layer 11. The loop fitting forms a circular opening 12 for mounting the loop fitting to a wall of a vehicle body, and further forms a slot 13 for the passage of the strap of a retractor-type safety belt. As is well known in the art, the loop fitting should be mounted at shoulder level at one side of a vehicle seat so as to reorientate the belt strap which passes from a retractor located below at the vehicle wall, and extends substantially vertically upwards to the loop fitting so as to run out therefrom after having passed through the slot 13, as a chest strap portion to locking means at the opposite side of the vehicle seat.

It is essential, of course, that it is not necessary to have a heavy spring load in the retractor so as to enable the retractor to retract the belt strap when the belt is put out of use. However, the spring load must be sufficiently heavy to make possible that the retractor can retract not only the belt strap but also a locking tongue hanging thereon. The locking tongue sometimes can be rather heavy. It is also necessary that the spring load can overcome the friction forces acting between the belt strap and the lower edge of the slot 13. If the spring load of the retractor is too heavy, the withdrawal of the belt strap when the belt is to be put into use, may be rather cumbersome. It also cannot be accepted that the withdrawal of the belt strap is restrained by high friction forces acting between the belt strap and the loop fitting. Such forces moreover may restrain the movements of the belt strap which should be allowed when the safety belt is in use, and are due to movements of the person, using the safety belt, when sitting on the seat.

Figure 3:
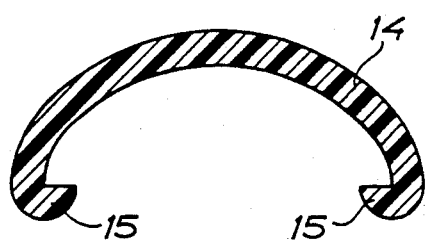
FIG. 3 is an enlarged cross-sectional view of the edge lining mounted to the loop fitting.

According to the invention, an edge lining 14 extends over the lower edge of the slot 13, and this edge lining consists of a low-friction material such as polytetrafluoro ethylene. The edge lining is shaped so as to form a curved contact surface for the belt strap. The forces which may act on the edge surface when the belt is in operation and is heavily loaded at abrupt braking or at a collision will be taken up by the underlying plastic material 11. As will be seen more clearly in FIG. 3, the edge lining 14 forms hook-shaped marginal portions 15 and at these marginal portions the edge lining is snapped onto shoulders 16 formed by the plastic layer 11 of the loop fitting. The edge lining must be made somewhat elastic in order to be snapped over the shoulders. The advantage of arranging an edge lining in this manner is that the loop fitting can be baked into a cheap plastic material which is well suited for this purpose, such as polypropylene, while the sliding or bearing surface contacting the belt strap, can be made of a high quality and accordingly more expensive plastic material having excellent bearing properties. The edge lining can be manufactured by conventional extrusion and can easily be mounted to the baked loop fitting. No substantial increase of the manufacturing costs is involved, but in any case a minor increase can be accepted in view of the improved function of the loop fitting, which is obtained by arranging the loop fitting as described.

A locking tongue can be arranged according to the invention in a manner analogous to that described above with reference to a loop fitting.

We claim:

1. A low friction guide fitting for use with retractor-type safety belts comprising a metal core member including first means for defining a mounting opening and second means for defining a belt receiving slot, a coating of a first plastic material baked onto said metal core member, said first plastic covering about said slot means, said first plastic coating forming shoulders at the front and rear sides of the fitting, said slot means including at least a lower edge, said first plastic coating including shaped recesses defining shoulders extending below and along said lower edge of said slot means, and an edge lining member comprised of a second plastic material having low friction characteristics, said edge lining being positioned over said lower edge, said edge lining member including hook-shaped marginal portions for engaging said shaped recesses so that when mounted within said slot means, said edge lining member is retained in place and forms a low friction contact surface over which the belt can be easily moved.

2. A low friction guide fitting as in claim 1, wherein said second plastic material comprises polytetrafluoro ethylene.

* * * * *